United States Patent [19]
Du et al.

[11] Patent Number: 5,867,008
[45] Date of Patent: Feb. 2, 1999

[54] OVERCHARGE PROTECTION CIRCUITRY FOR RECHARGEABLE BATTERY PACK

[75] Inventors: Xin Du, Bartlett; Edward F. Bachner, III, Lockport, both of Ill.

[73] Assignee: Double-Time Battery Corporation, Lockport, Ill.

[21] Appl. No.: 868,002

[22] Filed: Jun. 3, 1997

Related U.S. Application Data

[60] Provisional application No. 60/019,157 Jun. 5, 1996.
[51] Int. Cl.[6] ................................................. H01M 10/46
[52] U.S. Cl. ............................................................. 320/136
[58] Field of Search ................................. 320/128, 132, 320/134, 136, 150, 154, 163, 129, 147

[56] References Cited

U.S. PATENT DOCUMENTS

| | | | |
|---|---|---|---|
| 4,296,461 | 10/1981 | Mallory et al. | 363/22 |
| 4,535,325 | 8/1985 | Marsh | 340/636 |
| 4,578,628 | 3/1986 | Siwiak | 320/2 |
| 4,616,171 | 10/1986 | Hernandez et al. | 320/30 |
| 4,823,086 | 4/1989 | Whitmire et al. | 324/434 |
| 4,829,226 | 5/1989 | Nakamura et al. | 320/35 |
| 4,880,713 | 11/1989 | Levine | 429/100 |
| 4,965,738 | 10/1990 | Bauer et al. | 364/483 |
| 5,020,136 | 5/1991 | Patsiokas et al. | 455/89 |
| 5,162,719 | 11/1992 | Tomura et al. | 320/2 |
| 5,191,276 | 3/1993 | Zainaleain | 320/2 |
| 5,204,608 | 4/1993 | Koenck | 320/2 |
| 5,238,431 | 8/1993 | Kreisinger | 439/733 |
| 5,248,927 | 9/1993 | Takei et al. | 320/2 |
| 5,256,954 | 10/1993 | Chen | 320/2 |
| 5,298,346 | 3/1994 | Gyenes | 429/90 |
| 5,360,683 | 11/1994 | Broadfield | 429/99 |
| 5,406,266 | 4/1995 | Mino et al. | 340/636 |
| 5,434,508 | 7/1995 | Ishida | 324/427 |
| 5,455,499 | 10/1995 | Uskali et al. | 320/43 |
| 5,471,128 | 11/1995 | Patino et al. | 320/128 |
| 5,475,626 | 12/1995 | Viletto | 364/708.1 |
| 5,477,130 | 12/1995 | Hashimoto et al. | 320/49 |
| 5,487,181 | 1/1996 | Dailey et al. | 455/89 |
| 5,490,202 | 2/1996 | Maekawa | 379/58 |
| 5,498,950 | 3/1996 | Ouwerkerk | 320/18 |
| 5,510,690 | 4/1996 | Tanaka et al. | 320/2 |
| 5,514,946 | 5/1996 | Lin et al. | 320/31 |
| 5,534,366 | 7/1996 | Hwang et al. | 429/91 |
| 5,535,437 | 7/1996 | Karl et al. | 455/90 |
| 5,563,005 | 10/1996 | Ohtani et al. | 429/96 |
| 5,565,756 | 10/1996 | Urbish et al. | 320/15 |
| 5,568,039 | 10/1996 | Fernandez | 320/150 |
| 5,573,869 | 11/1996 | Hwang et al. | 429/91 |
| 5,576,610 | 11/1996 | Patino et al. | 320/31 |
| 5,576,612 | 11/1996 | Garrett et al. | 320/106 |

(List continued on next page.)

OTHER PUBLICATIONS bq2004 *Fast–Charge IC*, Benchmarq Microelectronics, Inc., Jan. 1998, pp. 1–16.
bq2012 *Gas Gauge IC*, Benchmarq Microelectronics, Inc., Jul. 1994, pp. 2–263–2–282.
bq2014 *Gas Gauge IC With External Charge Control*, Benchmarq Microelectronics, Inc., Dec. 1995, pp. 1–22.

*Primary Examiner*—Edward H. Tso
*Attorney, Agent, or Firm*—Jefferson Perkins; Foley & Lardner

[57] ABSTRACT

A self-contained, rechargeable battery pack uses a coulomb-counting control circuit to measure charge received by and taken from the cells and to store a current charge status of those cells. The control circuit controls a charge/discharge pass transistor in the pack to provide overcharge protection. An always-on trickle charge resistor insures that the controller is in operation during charging even when the cells associated with the controller are completely discharged. A Schottky diode is placed across the charge/discharge pass transistor in order to minimize the discharge dropoff voltage between the terminal of the cell and a corresponding external terminal. The present invention considerably lengthens the useful life of nickel-based rechargeable batteries, as measured in terms of both the number of cycles and the available capacity per cycle, while requiring no extra terminals.

12 Claims, 4 Drawing Sheets

U.S. PATENT DOCUMENTS

| | | | |
|---|---|---|---|
| 5,578,391 | 11/1996 | Meyers et al. | 429/97 |
| 5,592,095 | 1/1997 | Meadows | 324/436 |
| 5,602,460 | 2/1997 | Fernandez et al. | 320/30 |
| 5,606,241 | 2/1997 | Patino et al. | 320/48 |
| 5,606,242 | 2/1997 | Hull et al. | 320/48 |
| 5,608,306 | 3/1997 | Rybeck et al. | 320/15 |
| 5,614,807 | 3/1997 | Duley | 320/48 |
| 5,619,117 | 4/1997 | Koenck | 320/21 |
| 5,625,271 | 4/1997 | Shapiro et al. | 320/2 |
| 5,627,449 | 5/1997 | Fujiki | 320/5 |
| 5,628,054 | 5/1997 | Osaka | 455/89 |
| 5,629,604 | 5/1997 | Sengupta et al. | 320/145 |
| 5,631,101 | 5/1997 | Amero, Jr. | 429/90 |
| 5,631,537 | 5/1997 | Armstrong | 320/15 |
| 5,633,572 | 5/1997 | Steele et al. | 320/2 |
| 5,633,573 | 5/1997 | van Phuoc et al. | 320/5 |
| 5,635,821 | 6/1997 | Smith | 320/40 |
| 5,637,413 | 6/1997 | Fernandez et al. | 429/7 |
| 5,641,587 | 6/1997 | Mitchell et al. | 429/90 |
| 5,646,508 | 7/1997 | van Phuoc et al. | 320/30 |
| 5,648,715 | 7/1997 | Patino et al. | 320/152 |
| 5,652,500 | 7/1997 | Kadouchi et al. | 320/15 |
| 5,652,502 | 7/1997 | van Phuoc et al. | 320/30 |

OVERCHARGE PROTECTION CIRCUITRY FOR RECHARGEABLE BATTERY PACK

RELATED APPLICATION

This application claims priority to provisional application Ser. No. 60/019,157, filed Jun. 5, 1996 by the inventors hereof and assigned to the assignee hereof.

TECHNICAL FIELD OF THE INVENTION

The present invention relates in general to charging and discharging circuits for battery-powered devices, and more particularly to overcharge protection circuits integrated into battery packs for mobile devices.

BACKGROUND OF THE INVENTION

Nickel Cadmium (NiCd) batteries have been widely used for more than two decades as rechargeable power sources for portable devices. NiCd batteries, however, can cause environmental pollution, if improperly disposed of, since Cd is a highly poisonous material. NiMHi batteries, on the other hand, provide more power, are free of "memory effect" and are environment-friendly. But these batteries are more tricky and dangerous to charge and discharge than NiCd batteries due to the potential danger of overheating, subsequent venting of hydrogen and then catching fire. Therefore, "smart" or "intelligent" battery packs have gained more and more popularity in portable equipment, especially in laptop computer systems. Unfortunately, these conventional battery packs have not been introduced to small portable equipment such as cellular telephones because they are complex systems more suitable for higher power systems, like laptop and notebook computers, where the protected battery pack's own power consumption, size and ability to communicate with the computer are appropriate.

A serious problem exists today among those subscribers to cellular service who use portable phones: diminished battery life on their portable cell phones due to improper charging. The problem impacts the subscriber because he or she cannot use the portable phone to the extent desired without lugging along one or more spare battery packs. Also, many subscribers turn off their phones between calls to "save the battery", resulting in missed calls.

The problem impacts the cellular service provider also, in that the subscribers will use fewer "minutes" of air-time because of the problem with their batteries. Also, because many subscribers turn off their phones between calls to "save the battery", air-time revenue is lost which otherwise would have been generated by incoming calls to the subscriber. This is actually a more serious problem than the former, because air-time is used anyway trying to establish the call, but no billable call occurs.

It has been shown statistically that users of portable phones make 80 second calls on the average, while users of mobile phones make 180 second calls on the average, a significant lessening of billable air-time. This is caused, of course, by the subscriber's fear of using up his or her battery mid-call.

The manufacturers of portable cellular phones have traditionally incorporated a temperature sensing device, typically a thermistor, into their battery packs. The thermistor signals the associated charger that the battery cells are quite hot. At that point, the charger switches itself off or to a safe trickle current, the assumption being that reaching a predetermined high temperature of the battery cells means they are completely charged. Some chargers incorporate a voltage sensing circuit to determine the point of complete charge, although this is more difficult because of mismatched cells and performance changes over time, and is extremely difficult in a vehicle because of noise on the power feed. Some chargers incorporate both forms of protection.

Although these approaches may be appropriate for nickel cadmium (NiCd) cells, which are better able to tolerate abuse, they are insufficient for Nickel Metal Hydride (NiMHi) cells. As noted above, NiMHi cells vent explosive hydrogen gas when overheated, as can occur during overcharging. Also, venting of electrolyte, which occurs on both cell chemistries when severely overcharged, dramatically reduces remaining cell capacity.

Many manufacturers of chargers for battery packs do not make use of the battery pack thermistor. This is especially prevalent with charger-cords designed to be used in the vehicle's cigar lighter socket. It is not atypical for battery packs to deform from the heat caused by being left in a car overnight, as attached to a charger-cord. Other chargers, such as car-kits and overnight desk chargers, provide an intermediate level of current in an attempt to keep from overheating the cells. Depending on the environmental conditions to which the cells are subjected, the cells can be abused, especially NiMHi. Among those chargers which do take advantage of the battery pack thermistor, the failure mode often is to overcharge.

The state of the art is to focus on charger-based techniques of determining the end of the charge cycle using $dT/dt$, $-dV/dt$, etc. The focus of the inventors was instead to discover a way of assuring the subscriber the maximum use of his or her battery pack. The inventors looked for ways of building that assurance into the battery pack itself, so that the pack could be protected against abuse from any charger of any type, whether in good repair or not. Since the charge and discharge contacts are the same on most manufacturer's battery packs, and since packs would be charged while the phone was in use, any "charge" control circuit applied to the pack would have to simultaneously maintain a low-loss "discharge" path.

When a cellular subscriber purchases a brand-new battery today, one that should last for 180 minutes of talking between charges, the first thing he does on the way home is plug the pack into his car charger cord. The charger cord applies full charge current to the pack, whether the pack is charged or not. Later, at home, the subscriber drops the new pack in his desk charger because everyone knows one should charge a battery before one uses it. Later in the day he may drop the unit in his car kit, where it will be further overcharged. By the end of the first day he may have lost half of the battery's initial capacity.

The typical problems encountered by cellular users can be summarized as follows:

1. The chargers "cook" the batteries.
2. Many types of chargers, good and bad, are in use. The consumer may accidentally charge a NiMHi pack using a wrong charger, such as a NiCd charger, or a charger of poor design.
3. Some batteries, although equipped with a "gas-gauge" capacity indicator, can only measure the remaining power and cannot terminate charging when appropriate.

U.S. Pat. No. 5,218,284 (Burns et. al.) discloses a "universal battery" which embeds a switch matrix and switching power supply circuit to regulate the charge and discharge. It is a very complicated system, and its switching power supply converter has a conversion power loss. The useful efficiency is about 80 to 90%. Additionally, in order to block reverse current, a diode is used at the output which drops the output voltage, reducing the efficiency further.

Due to the limitations mentioned above, the prior art has not realized a NiMHi battery system with proper overcharge protection. A need therefore continues to exist for a low-cost NiMHi embedded charge control system for a cellular battery pack.

In recent years, many efforts have been made to develop battery protection circuits but almost all the work has been focused on chargers, not on the battery pack itself. Since the end user still may still mix the use of chargers and batteries, the prior art has not provided a workable solution to the problems noted above.

SUMMARY OF THE INVENTION

In comparison to prior art devices, a battery pack incorporating the invention senses its own charge state and switches to trickle, saving the battery from harm. This happens despite the type or repair condition of the chargers to which is it subjected. The pack maintains full capacity, and lasts more that a year without serious capacity loss.

A principal advantage of the invention from the subscriber's point of view is the ability to make calls whenever he or she wants, and talk as long as desired. Also, as equipped with a battery pack according to the invention, the phone can be left on between calls so that no call is missed. Another advantage is the money saved by protecting the investment made in the battery pack.

The advantages from the cellular carrier's point of view are (1) the subscriber makes more calls, generating more revenue; (2) subscribers answer more calls, generating more revenue; (3) the stationary infrastructure equipment is not busy handling calls to units which are shut off or have signals too weak to be usable.

Another advantage to the cellular carrier is call duration. One carrier experimented with giving new batteries to its best customers to see if the number of calls increased, which it did. From this one can infer that call duration will also increase where the subscriber does not have to fear a quick exhaustion of available battery energy.

The inventors have discovered that the cells get warm well before the point of overcharge, and that this effect can be sensed using a closely coupled precision thermistor that is thermally insulated from the environment. As opposed to conventional rapid chargers, which shut off when the battery has been charged to more than 125% of rated capacity, the present invention reliably senses when the battery has been charged to 94 to 98% of its capacity. As a complementary indicator, the present invention senses voltage accurately because the cells are isolated from vehicle noise.

In the present invention, a charger controller IC chip and a bi-directional power switch is integrated into a cellular telephone battery pack. The IC can be any low-power controller. The switch has a low forward resistance for discharge and is reversibly controllable. While possible, a mechanical switch such as a relay is not preferred because it is costly, needs power to operate and is large in size. A diode may be used as a switch but has a significant voltage drop (typically 0.7 volts). A typical 6 volt cellular telephone, such as the Motorola FLIP-PHONE™, will cut off at about 5.4 volts, while a fully charged 5-cell NiMHi pack has a voltage of about 6.2 volts. Therefore, even a small voltage drop will shorten the discharge cycle significantly. In order to overcome these problems it is preferred that the switch be a solid-state relay.

The present invention confers a principal technical advantage in that it provides a cost-effective protection circuit which may be integrated into the battery pack to prevent potentially dangerous situations.

Another technical advantage is the provision of a solid-state switching circuit to reduce the forward voltage drop to minimum during discharge, such that the maximum battery energy can be used.

Another technical advantage of the present invention is to provide a battery pack that can be charged by any type of commercial charger without damaging the battery cell(s) and creating a hazard.

These technical advantages are accomplished by inserting the current path of a pass transistor, such as a field effect transistor, in the path between one of the positive and negative battery pack terminals and a corresponding terminal of the batteries proper. A control electrode of the pass transistor is coupled to a control circuit which senses the voltage and temperature condition of the batteries in the pack. Once a predetermined voltage threshold or a predetermined temperature threshold is reached, the control circuit limits the charging circuit to a trickle charge by shutting off the pass transistor. Preferably, a diode, such as a Schottky diode, bridges the current path of the pass transistor to reduce voltage drop during discharge mode.

BRIEF DESCRIPTION OF THE DRAWINGS

Further aspects of the invention and their advantages may be discerned in the following detailed description when read in conjunction with the drawings, in which like characters identify like parts and in which.

DETAILED DESCRIPTION OF THE INVENTION

Figure 1:
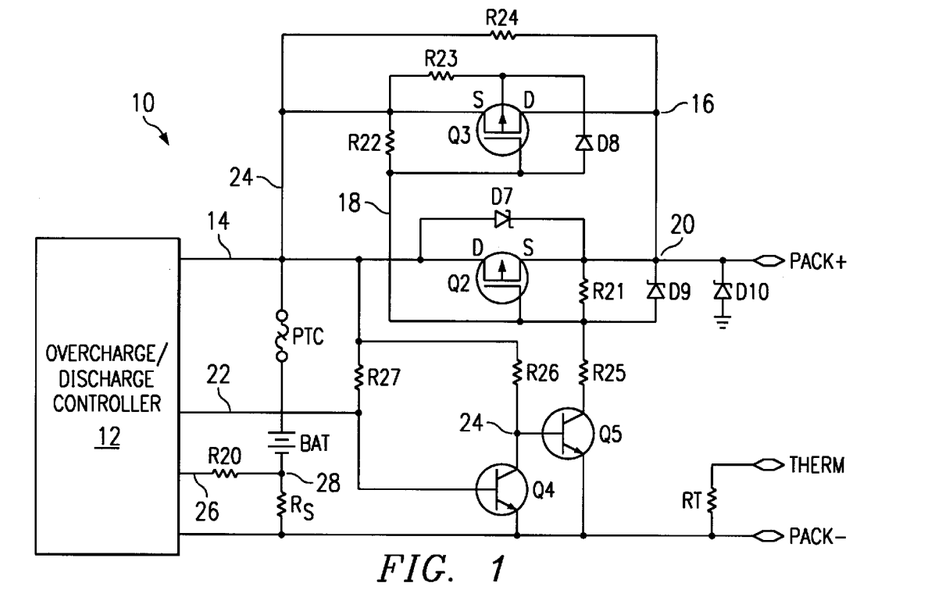
FIG. 1 is a schematic electrical diagram of a first embodiment of a battery protection circuit according to the present invention.

Referring to FIG. 1, a battery charging, discharging and protection system is indicated generally at 10. An overcharge/discharge controller 12 can be any type charge controller suitable for a NiMHi battery. For example, a Benchmarq™ bq2002T charge controller, a gas-gauge IC like the Benchmarq™ bq2012, or a microcontroller such as Microchip's PIC16CXX are all good choices in terms of low power consumption and controlling features.

A line 14 connects the controller 12 to a source of a p-channel field-effect transistor Q3 and in parallel also to a resistor R24, a resistor R23, a resistor R22, an anode of a Schottky diode D7, a drain of a p-channel field effect transistor Q2, a polyfuse PTC, a biasing resistor R27 and a biasing resistor R26. Representative values for the aforementioned resistors are 10K for R24, 1M for R23, 49.9K for R22, 49.9K for R26 and 49.9K for R27.

Resistor R24 is connected between line or node 14 and a node 16, to which is connected a drain of the 4-terminal FET Q3. In the situation of overdrain and long storage, which tend to shut down the controller and cause logic error, resistor R24 will "activate" the controller to a normal operating condition by providing a small current from the external charger. Resistor R23 is connected between node 14 and a bulk connection of transistor Q3. Resistor R22 is connected between node 14 and a node 18, to which are connected gates of both transistors Q3 and Q2. A cathode of a diode D8 is connected to the bulk connection of 4-terminal FET Q3, while an anode thereof is connected to node 18. A cathode of Schottky diode D9 is connected to a node 20, to which is further connected a cathode of a Zener diode D10, a resistor R21, a source of FET Q2, a cathode of Zener diode D10, and a PACK+ power terminal of the circuit 10.

An anode of diode D9 is connected to node 18, as is a resistor R25.

The criteria for MOSFET Q2 are a low "On" resistance and a low control voltage. For charge control FET Q2, the National Semiconductor NDS9435 PMOS or NDT3055 NMOS can be used. The choice for 4-terminal MOSFET Q3 can be Micrel's MIC94030 or Siliconix Si9718CY, which has a charge pump inside (not shown).

One major concern is associated with the general operating mechanism of the reverse use of the MOSFET Q2 during discharge. The transconductance will drop significantly in this situation in comparison with the standard forward usage. A body diode typically has a forward dropoff voltage of 0.7 to 1.2 Volts, which is too high to aid in lowering the channel resistance. A newly developed Schottky diode D7 is now available with only a 0.25 forward dropoff drop. In the present invention, the voltage drop between nodes 14 and PACK+ is minimized by applying two FETs Q2 AND Q3 together. One is the charge FET Q2 with enough Vgs applied to reduce the body diode voltage drop, the other is achieved by paralleling the forward connected 4-terminal FET Q3 which inherently blocks the charging current but is on for discharging.

The low voltage dropoff Schottky diode D7 is placed in parallel with the FET Q2 to "help" reduce the forward voltage drop further.

Another major concern is the power consumption of the electronic controlling circuit 10. A low power circuit has to be carefully designed. Its current drain should be much less than the self-discharge rate of the battery. Low power consumption devices like MOS devices are preferred; also, the working current of the transistors should be cut to a minimum by the provision of high value resistors.

A terminal 22 of the controller 12 is connected to one end of resistor R27, the other end of which is connected to node 14. Terminal or node 22 is further connected to a base of an NPN bipolar transistor Q4. A collector of transistor Q4 is connected to a node 24, which is connected to one end of resistor R26 and to a base of NPN bipolar transistor Q5. Resistor R26 is connected between nodes 24 and 14.

A terminal 26 of controller 12 is connected to one end of resistor R20, the other end of which is connected to a node 28. Node 28 is in turn connected to the anode of the cellular telephone battery stack BAT, which consists of several cells connected in series, the number of cells depending on the type of phone. The cathode of battery stack BAT is connected to polyfuse PTC.

A fourth terminal of controller 12 is connected directly to negative battery pack terminal PACK−, and is also connected to the emitters of transistors Q4 and Q5. Resistor R5 connects the PACK− node to node 28. Representative values of the remaining resistors are as follows: R27, 49.9 kΩ; R25, 100Ω; R20, 49.9 kΩ; $R_s$, 0.054 Ω.

As occurs on some commercial battery packs, a thermistor RT connects node PACK− to a thermistor output THERM. Although not so indicated in FIG. 1, thermistor RT is physically positioned proximate the battery stack BAT to provide an accurate reading of the batteries' temperature for external chargers.

The operation of the circuit shown in FIG. 1 is as follows. In a charge mode, transistor Q2 will be on, allowing current to pass to node 14 and thence to the battery BAT. The overcharge/discharge controller 12 monitors the charging by a predetermined method and limit, e.g., dT/dt, peak voltage detection, etc. When the battery is fully charged, control line 22 will go from low to high, turning on transistor Q4. This depletes the voltage present at node 24, turning off transistor Q5. Current will no longer be sunk through transistor Q5 from node 18, and therefore the voltage on node 18 will rise, turning off p-channel FETs Q3 and Q4. This cuts off the current path from node PACK+ to node 14.

In discharge mode, node 18 will be low, transistor Q5 will be on, transistor Q4 will be off and node 22 will be low. The combined parallel resistance of transistors Q2 and Q3 and diode D7 will be relatively small, permitting the outflow of current to node PACK+ with a minimum of voltage drop. The overcharge/discharge controller 12 senses the directionality of the current and thus whether the circuit is in charge mode or discharge mode, by the voltage polarity on resistor $R_s$, which for example can be a Benchmarql bq2012. Diode D8 protects transistor Q3 from power surges. Resistors R25, R26 and R27 provide bias to bipolar transistors Q4 and Q5.

Figure 2:
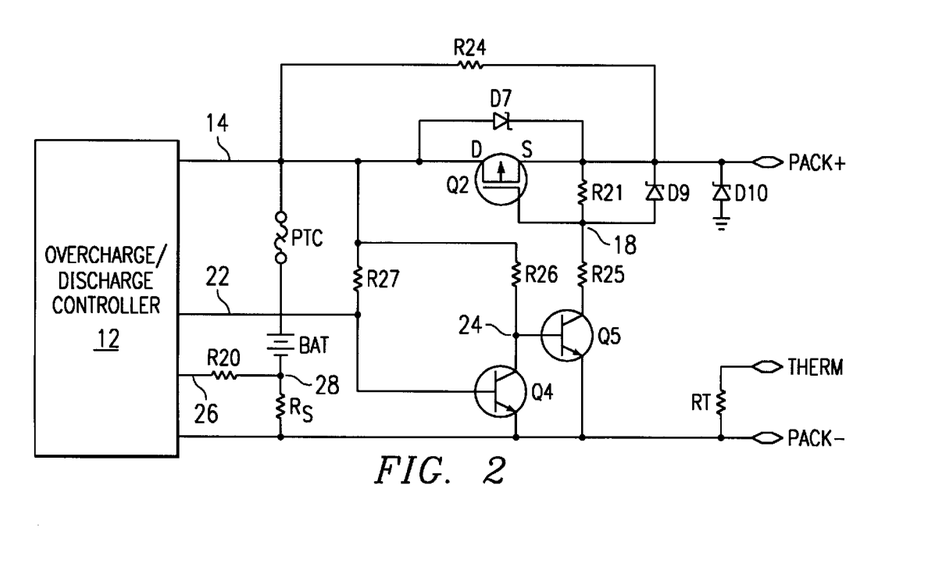
FIG. 2 is a schematic electrical diagram of a second embodiment of the invention.

FIG. 2 is a schematic electrical diagram of a second simplified embodiment. The 4-terminal MOSFET Q3 (see FIG. 1), is removed to cut down on cost. For low current applications, the combination of the low dropout Schottky diode D7 and reversed MOSFET Q2 will help each other to reduce the forward voltage drop from node 14 to output node PACK+. Also removed are certain components related to FET Q3: resistors R22 and R23, and diode D8.

The operation of the circuit shown in FIG. 2 is similar to that shown in FIG. 1.

By applying these techniques, a discharge drop of less than 50 mV is achieved in the circuits of FIGS. 1 and 2 as measured when system 10 is supplying 600 mA, which is experienced during "talk" mode. This voltage drop is close in size to that caused by the internal wiring and the "polyfuse" PTC and will not affect the service life of the battery.

In FIGS. 1 and 2, Zener diodes D9 and/or D10 (one or both can be used) further protect against some high-voltage, current-source type chargers and some so-called "conditioning" chargers designed for Nickel Cadmium batteries and which are claimed to have "reverse pulse."

It has been found that a low current bypass resistor R24 (FIGS. 1 and 2) is needed to ensure the circuit functions properly when the battery has been completely drained. In this condition, controller 12 has logic uncertainty. Charging in this situation is dangerous to the FETs Q2 and (in FIG. 1) Q3. A low current bypass will allow the external charger to provide enough voltage to "activate" the controller circuit 12.

Figure 3:
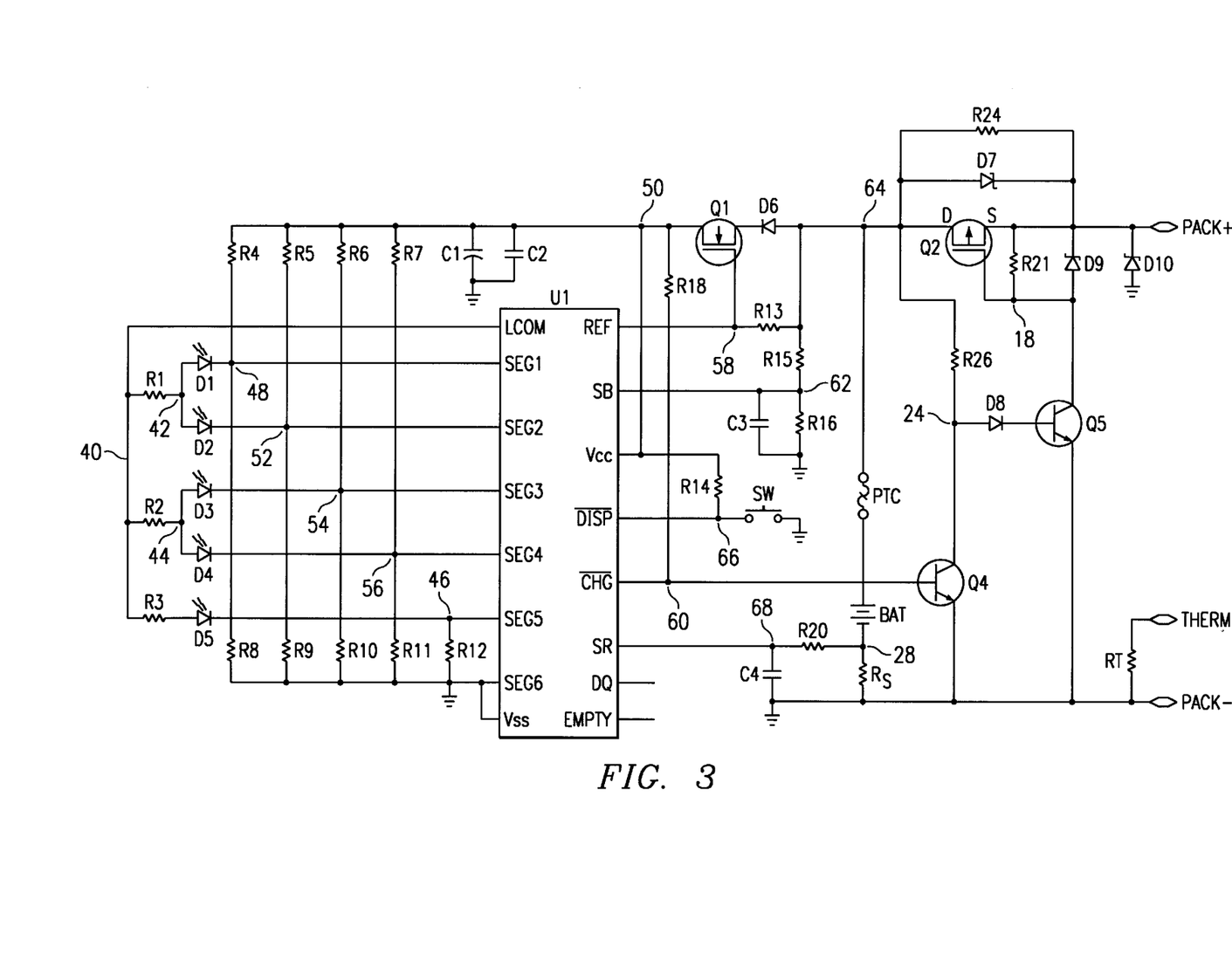
FIG. 3 is a schematic electrical diagram of a third embodiment of the invention.

Referring to FIG. 3, a gas-gauge controller U1 is used to control the solid-state switch. The controller may be a Benchmarq™ bq2012 gas-guage IC which counts the coulombs of energy flowing into and out of the battery BAT by measuring the amount, polarity and duration of the voltage drop across resistor $R_s$, (between node 28 and PACK−). An LCOM port of the gas-gauge IC U1 is connected to a node 40. Node 40 is connected through a resistor R1 to a node 42.

Similarly, a resistor R2 connects node 40 to node 44. The node 40 is connected directly through a resistor R3 to the anode of a light emitting diode (LED) D5, the cathode of which is connected to a node 46. Node 46 is connected via a resistor R12 to ground and to a SEG5 port of the gas-gauge integrated circuit U1.

Node 42 is connected to an anode of a LED D1, the cathode of which is connected to a node 48. Node 48 is connected to a SEG1 port of the gas-gauge integrated circuit U1, while a resistor R4 connects node 48 to a node 50. Node 42 is further connected to an anode of a LED D2, the cathode of which is connected to a node 52. Node 52 is connected via a resistor R5 to the node 50 and further is connected to a port SEG2 of unit U1. An anode of a third LED D3 is connected to node 44, while a cathode thereof is connected to a node 54. Node 54 is connected via a resistor R6 to the node 50, and further is connected to a SEG3 port of the gas-gauge controller U1. An anode of a fourth LED D4 is connected to node 44, while a cathode thereof is connected to a node 56. Node 56 is connected via a resistor R7 to node 50 and further is connected to a SEG4 port of the gas-gauge controller U1. Nodes 48, 52, 54 and 56 are respectively connected by resistors R8, R9, R10 and R11 to ground. Resistor R12 connects the node 46 to ground to complete the resistance network formed by resistors R4–R12. Ports SEG6 and VSS of the gas-gauge U1 are connected to ground, while a VCC port is connected to node 50. Capacitors C1 and C2 are connected in parallel between node 50 and ground. Diodes D1–D3 may for example form segments of a bar graph display, and are selectively illuminated to indicate the relative level of charge in battery BAT.

Representative values for resistors R1–R12 are as follows: resistors R1–R3, 330Ω; resistors R4–R12, 100kΩ. Capacitor C1 may have a value of 1 $\mu$F, while capacitor C2, used for filtering purposes, may be 0.1 $\mu$F.

A reference port REF of controller U1 is connected to a node 58, which in turn is connected to a gate of an n-channel field effect transistor Q1. A source of the transistor Q1 is connected to node 50, while a drain thereof is connected to the cathode of a diode D6. Signal port $\overline{CHG}$ of the controller U1 is connected to a node 60, which in turn is connected via a resistor R18 to node 50 and further to the base of bipolar transistor Q4. Port SB is connected to a node 62 which is connected by capacitor C3 and a resistor R16 to ground, and further is connected by a resistor R15 to a node 64. Node 64 is connected to the anode of diode D6, to resistor R26, to resistor R24, to the anode of Schottky diode D7 and to the drain of three-terminal n-channel field effect transistor Q2. A resistor R13 connects node 64 to node 58, while a resistor R15 connects node 64 to node 62. A port $\overline{DISP}$ of the controller U1 is connected to a node 66, which is connected to a first pole of a push-button switch SW, the second pole of which is connected to ground. Node 66 is connected through a resistor R14 to node 50. A port SR of the controller U1 is connected to a node 68, which is connected via a capacitor C4 to negative battery pack output terminal PACK– and is connected via a resistor R20 to a node 28. Representative values for the last portion of the above-described circuit are as follows: R14, 100 kΩ; R18, 200 kΩ; R13, 200 kΩ; R15, 200 kΩ; R16, 49.9 kΩ; and capacitors C3 and C4, 0.1 $\mu$F.

The remainder of the circuit shown in FIG. 3 is generally similar to the corresponding portion shown in FIG. 2. A resistor R24 connects node 64 to positive battery pack output terminal PACK+. The drain and source of the n-channel FET Q2 are bridged by the Schottky diode D7, as before. Node 64 is connected via a resistor R26, which in this embodiment is 100 kΩ, to node 24, which is connected to an anode of a diode D8. A cathode of the diode D8 is connected to the base of a bipolar transistor Q5, the collector of which is connected to node 18. Node 24 is also connected to the collector of bipolar transistor Q4. The emitters of transistor Q4 and Q5 are connected to the negative output battery terminal PACK–. The positive battery pack output terminal PACK+ is connected to the cathodes of Zener diodes D9 and D10. A resistor R21 connects node PACK+ to node 18. Representative resistor values for resistor R24 and R21 are as previously mentioned in conjunction with FIGS. 1 and 2.

In the embodiment shown in FIG. 3, the voltage and current (through the voltage drop across resistor $R_s$,) of the battery BAT are sensed at nodes 62 and 28 respectively, by the gas-gauge controller U1. In this configuration, the amount of charging is counted and controlled by controller U1. Thus, no additional temperature sensing is required. Internally, however, controller U1 does have a maximum temperature shutdown for even safer operation. The control line $\overline{CHG}$ is used to control the p-channel field effect pass transistor Q2 by selective energization of transistors Q4 and Q5, thus controlling of the voltage at gate node 18. Switch SW is the pushbutton for users to check the "fuel" or charge level of the battery BAT. Transistor Q1 and resistor R13 form a simple regulator. Capacitors C1 and C2 are bypass capacitors. Resistors R18, R14, R13, R15 and R16, and capacitors C3 and C4 are placed to filter out noise.

Figure 4:
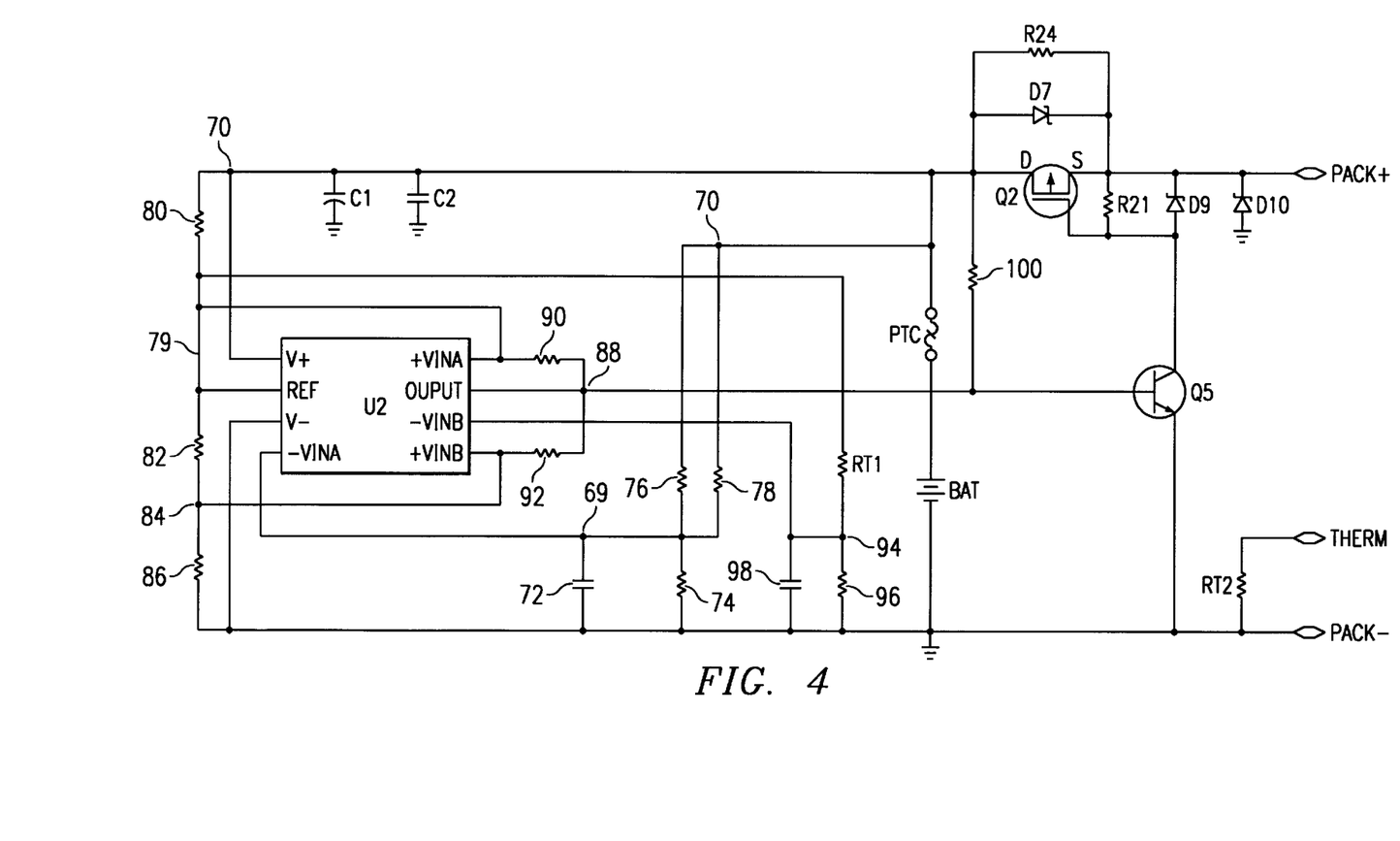
FIG. 4 is a schematic electrical circuit diagram of a fourth embodiment of the invention.

FIG. 4 shows a fourth embodiment, used in particular for a 1900 mAh NiMHi battery pack for a cellular telephone. In FIG. 4, a voltage comparator U2, which for example may be an LM612, has a terminal –VINA connected to a node 69. A node 69 is connected by a capacitor 72 to negative battery pack output terminal PACK–. Node 69 is connected by resistors 76 and 78 to a node 70, which is connected to the drain of a p-channel field effect transistor Q2.

A terminal V+ of the comparator U2 is also connected to node 70. A terminal REF of comparator U2 is connected to a node 78, which is connected via a resistor 80 to node 70 and a resistor 82 to a node 84. Node 84 is connected to a terminal +VINB of the comparator U2, and to the output terminal PACK– by a resistor 86. A terminal V– of comparator U2 is connected directly to output terminal PACK–.

A terminal +VINA of comparator U2 is connected to a node 79, and is also connected to a node 88 via a resistor 90. An OUTPUT terminal of the comparator U2 is connected to node 88, which is also connected to the base of a bipolar NPN transistor Q5. A terminal +VINB is connected to a node 84, which is connected to node 88 by a resistor 92. Representative values for the resistors in this portion of the circuit are: resistor 82, 4.02 kΩ; resistor 86, 10 kΩ; resistor 80, 20 kΩ; resistors 76 and 78, 200 kΩ, which are reserved for manufacturing test purposes; resistor 74, 36.5 kΩ. Capacitor 72 may have a value of 0.1 $\mu$F.

A terminal –VINB of the comparator U2 is connected to a node 94. Node 94 is connected to node 78 by a first thermistor RT1 and to the negative battery pack output terminal PACK– by a resistor 96. Node 94 is also connected to node PACK– in parallel by a capacitor 98. Capacitor 98 and resistor 96 may, for example, be 0.1 $\mu$F and 10 kΩ, respectively. The polyfuse PTC and the battery stack BAT are connected in series between node 70 and negative output terminal PACK–. A resistor 100, which preferably is greater than 100 KΩ for low power consumption, connects the drain of the FET Q2 to the base of bipolar transistor Q5.

The remainder of this embodiment is similar to those already described. The current path of the p-channel field effect transistor Q2 connects node 70 to positive battery output terminal PACK+, and is bridged by a Schottky diode D7 and a resistor R24, as before. A resistor R21 and a Zener diode D9 are connected in parallel between a gate of the FET Q2 and the source thereof. The gate of transistor Q2 is connected to the collector of bipolar transistor Q5, the emitter of which in turn is connected to node PACK−. An output Zener diode D10 is connected between the positive battery pack output terminal PACK+ and ground. A second thermistor RT2 is connected between node PACK− and a thermistor output.

In order to sense temperature, comparator U2 senses the voltage between terminals 78 and 94 (+VINA, −VINB), thereby sensing the voltage drop across first thermistor RT1. In order to sense the voltage across the battery BAT and thereby determine the relative charge state of the battery, comparator U2 senses the voltage difference between nodes 69 and 84, which are resistively coupled to the terminals of the battery BAT. Upon reaching either of a pair of predetermined limits, such as 47° C. or 7.8 V, comparator U2 will send a low signal on its OUTPUT terminal (node 88), thereby turning bipolar transistor Q5 off. Activation of the current path of bipolar transistor Q5 raises the voltage at the gate of p-channel FET Q2, thereby turning off this gating transistor and effectively cutting off charging current occurring on terminal PACK+. However, the presence of bridging Schottky diode D7 reduces the voltage drop across FET Q2 in the instance where the battery BAT is delivering power to the connected device.

Figure 5:
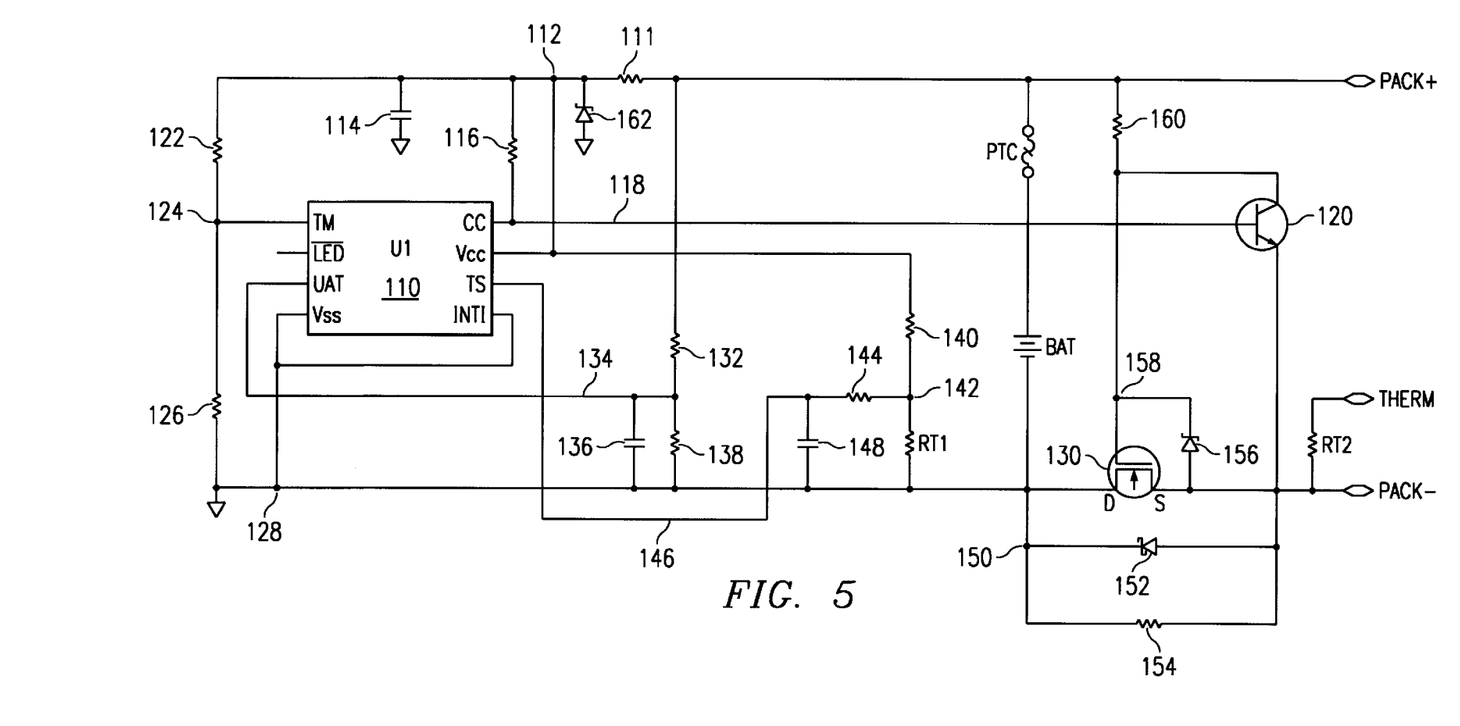
FIG. 5 is a schematic electrical circuit diagram of a fifth embodiment of the invention using low-side control.

FIGS. 1–4 represent applications using p-channel MOSFETs for a "high side" switch. If an n-channel MOSFET were used, a resultant "low side" control will function in the same fashion but will need reversed logic. FIG. 5 shows a low side control using a Benchmarq™ bq2002 controller 110. The output node PACK+ is connected via a resistor 111 to a node 112, which is connected to a controller power input $V_{cc}$. A capacitor 114 connects node 112 to ground. A resistor 116 connects node 112 to a node 118, which in turn is connected to a terminal CC of the controller 110 and to the base of a PNP bipolar transistor 120. A resistor 122 connects node 112 to a node 124, which in turn is connected to a terminal TM of the controller 110. A resistor 126 connects node 124 to a grounded node 128, in turn connected to a $V_{ss}$ terminal of the controller 110 and to the drain of an n-channel field effect transistor 130.

Node PACK+ is further connected via a resistor 132 to a node 134, which is connected to a battery sensor terminal BAT of the controller 110. A capacitor 136 and a resistor 138 connect node 134 is parallel to node 128. Node 112 is also connected via a resistor 140 to a node 142, which is connected via a thermistor RT1 to node 128. A resistor 144 connected node 142 to a node 146, which is connected to a temperature sensor terminal TS of the controller 110 and via a capacitor 148 to node 128.

The battery BAT and the polyfuse PTC are connected in series between node PACK+ and a node 150. Node 150 is connected to the cathode of a Schottky diode 152, the anode of which is connected to output terminal PACK−. A high-value resistor 154 (such as 10 kΩ) also connects node 152 to PACK−. An anode of a Zener diode 156 connects node PACK− to a node 158, which in turn is connected to the gate of the n-channel FET 130, to the collector of PNP bipolar transistor 120 and through a resistor 160 to the positive terminal PACK+. The source of transistor 130 is connected to PACK−.

In the charge mode of operation, a high signal on the control line 118 from the controller 110 turns on transistor 120, sinking current from the gate node 158 to node PACK−. Reducing the voltage at node 158 turns off the n-channel pass transistor 130, thereby cutting off current flow between node 150 and PACK−. In discharge mode, the placement of the Schottky diode 152 in parallel with the n-channel transistor 130 reduces voltage drop between PACK− and the ground node 128.

The controller 110 senses temperature across thermistor RT1 between nodes 146 and 128, and senses the battery voltage between nodes 112 and 128. Resistors 160 and 116 are selected to appropriately bias the bipolar transistor 120. A Zener diode 162 connects node 112 to ground. As in the previously illustrated embodiments, diodes 162 and 156 are furnished as protection against certain high-voltage, current-source chargers and certain "conditioning" chargers that have a reverse pulse characteristic.

In summary, several embodiments of an integrated battery charge/discharge protection circuit have been shown and described. Each of the embodiments uses a pass transistor having a control electrode controlled by a control circuit to connect or disconnect one of the external battery pack terminals from the battery. The discharge path resistance is reduced by the combination of a MOSFET and a diode across the pass transistor.

While several embodiments and their technical advantages have been described in the above detailed description, the invention is not limited thereto but only by the scope and spirit of the appended claims.

What is claimed is:

1. A battery pack charge and discharge protection circuit, comprising:
   a first external power terminal and a second external power terminal;
   a battery having positive and negative terminals;
   a pass transistor having a current path and a control electrode for controlling the conductance of the current path, said pass transistor selectively coupling a preselected one of said external power terminals to a respective one of said terminals of said battery having the same polarity;
   a Schottky diode coupled across the current path of the pass transistor to limit the voltage drop during discharge of the battery; and
   a control circuit having an output coupled to said control electrode of said pass transistor, said control circuit having terminals coupled across said battery to sense the charge status thereof,
   said control circuit actuating said pass transistor to permit charging of said battery when the charge status of said battery is at or below a predetermined charge status level, said control circuit controlling said pass transistor to prohibit charging of said battery when said charge status of said battery exceeds said predetermined charge status level.

2. The circuit of claim 1, and further comprising a temperature sensor in said control circuit, said control circuit actuating said pass transistor to permit charging of said battery when both the charge status of said battery is at or below the predetermined, stored charge status level and the temperature of the control circuit is at or below a predetermined temperature.

3. The circuit of claim 1, wherein the control circuit comprises a gas gauge controller.

4. The circuit of claim 1, wherein the current path of the pass transistor selectively couples the positive terminal of the battery to the first external power terminal.

5. The circuit of claim 1, wherein the pass transistor is a field effect transistor.

6. The circuit of claim 1, wherein the battery comprises a plurality of cells connected in series between the positive and negative terminals of the battery.

7. The circuit of claim 1, wherein the current path of the pass transistor is coupled to the respective one of the terminals of the battery by a fuse.

8. The circuit of claim 1, wherein the battery is nickel-based.

9. A rechargeable battery protection circuit, comprising:

at least one cell, positive and negative battery terminals coupled to said at least one cell;

a solid state switch having a current path with a first end coupled to a preselected one of the positive and negative battery terminals and a control electrode for controlling the conductance of the current path, the current path of the solid state switch selectively coupling the preselected one of the positive and negative battery terminals to a corresponding power terminal;

a control circuit coupled to the control electrode for switching the solid state switch; and a diode coupled across the current path of the solid state switch to limit the voltage drop during discharge of said at least one cell to no more than 0.25 volts.

10. The circuit of claim 9, wherein a plurality of cells are coupled in series between the positive and negative battery terminals.

11. The circuit of claim 9, wherein a fuse couples the preselected one of the positive and negative battery terminals to the current path of the solid state switch.

12. The circuit of claim 9, wherein the solid state switch comprises a field effect transistor.

* * * * *